(12) United States Patent
Johansson et al.

(10) Patent No.: US 9,925,596 B2
(45) Date of Patent: Mar. 27, 2018

(54) TURNING TOOL HOLDER AND CUTTING TOOL INSERT

(71) Applicant: SANDVIK INTELLECTUAL PROPERTY AB, Sandviken (SE)

(72) Inventors: Adam Johansson, Sandviken (SE); Gustav Gewers, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 281 days.

(21) Appl. No.: 14/715,447

(22) Filed: May 18, 2015

(65) Prior Publication Data

US 2015/0328688 A1    Nov. 19, 2015

(30) Foreign Application Priority Data

May 19, 2014    (EP) .................................... 14168809

(51) Int. Cl.
  *B23B 27/10*    (2006.01)
  *B23B 27/14*    (2006.01)
  *B23B 27/16*    (2006.01)

(52) U.S. Cl.
  CPC ............ *B23B 27/10* (2013.01); *B23B 27/143* (2013.01); *B23B 27/1618* (2013.01); *B23B 27/1622* (2013.01); *B23B 2200/0423* (2013.01); *B23B 2200/321* (2013.01); *B23B 2200/3627* (2013.01); *B23B 2200/3681* (2013.01); *B23B 2205/12* (2013.01); *B23B 2205/16* (2013.01);

(Continued)

(58) Field of Classification Search
  CPC ...... B23B 2200/321; B23B 2200/3627; B23B 2200/3681; B23B 2205/12; B23B 2205/16; B23B 2250/12; B23B 27/10; B23B 27/143
  See application file for complete search history.

(56) References Cited

U.S. PATENT DOCUMENTS 4,074,949 A * 2/1978 Hochmuth .......... B23B 27/1614
                                                    407/100
4,294,566 A * 10/1981 Boone ................. B23B 27/1622
                                                    407/104

(Continued)

FOREIGN PATENT DOCUMENTS

DE    3004166 A1 *  8/1980 ............. B23B 27/10
EP    0100376 A2    2/1984

(Continued)

*Primary Examiner* — Sara Addisu
(74) *Attorney, Agent, or Firm* — Corinne R. Gorski

(57) ABSTRACT

A turning tool holder includes a tool body, a cutting tool insert, and a shim. A coolant conduit system extends through the turning tool holder, a first portion of the coolant conduit system extending through the tool body and an end portion of the coolant conduit system extending through the shim. The end portion of the coolant conduit system includes a through hole extending from a first surface to an opposite second surface of the shim. The end portion has a coolant outlet opening at the second surface, the coolant outlet opening being formed by the shim alone. A jet of coolant from the coolant outlet opening may be directed towards a space expected to have a cutting zone of a workpiece. Further a cutting tool insert arranged to be used in a turning tool holder is disclosed.

16 Claims, 6 Drawing Sheets

(52) U.S. Cl.
CPC ......... *B23B 2250/12* (2013.01); *Y10T 407/14* (2015.01); *Y10T 407/235* (2015.01)

(56) References Cited

U.S. PATENT DOCUMENTS

| | | | | |
|---|---|---|---|---|
| 4,535,216 | A * | 8/1985 | Cassidenti | B23B 1/00 219/68 |
| 5,439,327 | A * | 8/1995 | Wertheim | B23B 27/045 407/11 |
| 5,775,854 | A * | 7/1998 | Wertheim | B23B 27/04 407/11 |
| 6,872,034 | B2 * | 3/2005 | Satran | B23C 5/2213 407/103 |
| 8,061,241 | B2 * | 11/2011 | Rozzi | B23B 27/10 407/11 |
| 8,282,320 | B2 * | 10/2012 | Hartlohner | B23B 27/1618 407/113 |
| 8,439,608 | B2 * | 5/2013 | Chen | B23B 27/10 407/103 |
| 8,596,935 | B2 * | 12/2013 | Fang | B23B 27/007 407/11 |
| 9,511,421 | B2 * | 12/2016 | Chen | B23B 27/1677 |
| 9,744,597 | B2 * | 8/2017 | Wernh | B23B 27/145 |
| 2005/0063792 | A1 * | 3/2005 | Satran | B23C 5/1072 407/113 |
| 2005/0214081 | A1 * | 9/2005 | Satran | B23C 5/06 407/113 |
| 2006/0140728 | A1 * | 6/2006 | Giannetti | B23B 27/10 407/11 |
| 2008/0232912 | A1 * | 9/2008 | Bhagath | B23C 5/06 407/114 |
| 2008/0273931 | A1 * | 11/2008 | Spitzenberger | B23C 5/202 407/51 |
| 2010/0129166 | A1 * | 5/2010 | Hartlohner | B23B 27/1618 407/102 |
| 2010/0254775 | A1 * | 10/2010 | Hecht | B23B 27/1622 407/103 |
| 2011/0052337 | A1 * | 3/2011 | Dudzinsky | B23C 5/006 407/40 |
| 2012/0195700 | A1 * | 8/2012 | Chen | B23C 5/06 407/40 |
| 2013/0017024 | A1 * | 1/2013 | Hofermann | B23B 27/10 407/11 |
| 2013/0129432 | A1 * | 5/2013 | Jaeger | B23C 5/207 407/42 |
| 2014/0064864 | A1 * | 3/2014 | Kaufmann | B23B 27/141 407/114 |
| 2016/0167137 | A1 * | 6/2016 | Agic | B23B 27/1662 407/66 |

FOREIGN PATENT DOCUMENTS

| | | | |
|---|---|---|---|
| JP | H0825111 | A | 1/1996 |
| JP | 08039387 | A * | 2/1996 |
| JP | 2003266207 | A | 9/2003 |
| JP | 2006136953 | A * | 6/2006 |
| WO | 2014033549 | A2 | 3/2014 |

* cited by examiner

TURNING TOOL HOLDER AND CUTTING TOOL INSERT

RELATED APPLICATION DATA

This application claims priority under 35 U.S.C. § 119 to EP Patent Application No. 14168809.3, filed on May 19, 2014, which the entirety thereof is incorporated herein by reference.

TECHNICAL FIELD

The present disclosure relates to a turning tool holder and a cutting tool insert to be used with a turning tool holder.

BACKGROUND

A turning tool holder is arranged to hold a cutting tool insert. The turning tool holder, including the cutting tool inset, is used in a machine tool such as a lathe for machining of a workpiece. Turning tool holders of many different configurations, and adapted to be used with cutting tool inserts of many different geometries are known. Namely, depending on what kind of turning operation is to be performed on a workpiece, the turning tool holder must be able to reach a relevant portion of the workpiece and the cutting tool insert must have a suitable geometry.

A cutting tool insert is commonly provided with two or more cutting edges. Thus, the cutting tool insert may be placed in two or more different positions in a relevant turning tool holder to expose one of the cutting edges at a time to engage with a relevant workpiece. Put differently, the cutting tool insert is indexable the same number of times as there are cutting edges.

Coolant, also referred to as cooling liquid or a cooling fluid, may be distributed to a cutting zone of a workpiece. Commonly the coolant is a liquid but gas, such as air, may be used as a coolant in some cutting applications. Traditionally, for this purpose a lathe may be provided with a separate nozzle adapted to be directed towards a workpiece. A more modern approach is to provide one or more nozzles for coolant integrated in a turning tool holder. Thus, the nozzle(s) may be arranged in close vicinity of a cutting zone of a workpiece. Nozzles for coolant may be provided in a turning tool holder at a rake face side and/or a relief face side of a cutting edge of a cutting tool insert.

U.S. Pat. No. 8,454,274 discloses an indexable cutting insert comprising a coolant delivery trough, which has a radial orientation toward a corresponding corner cutting region. With reference to FIGS. 5-7 the document discloses a shim arranged below the cutting insert. A coolant passage is provided in the shim and a coolant outlet is formed between the cutting insert and the shim.

In such a prior art arrangement, i.e., a jet of coolant from the coolant outlet, is influenced by both the shim and the cutting insert. Accordingly, if a relevant corner cutting region of the cutting insert is worn from prior use and then positioned to form the coolant outlet together with the shim, the jet of coolant from the coolant outlet may differ depending on the wear of the cutting insert.

SUMMARY

It is an object of the present disclosure to provide a turning tool holder configured to direct a controlled repeatable jet of coolant towards a space expected to comprise a cutting zone of a workpiece from a relief face side of a cutting edge of a cutting tool insert.

According to an aspect of the invention, the object is achieved by a turning tool holder including a tool body, a cutting tool insert, a shim, and a clamping arrangement. The tool body has a recess, the shim being arranged at a bottom portion of the recess and the cutting tool insert being releasably clamped by the clamping arrangement against the shim. A coolant conduit system extends through the turning tool holder, a first portion of the coolant conduit system extending through the tool body and an end portion of the coolant conduit system extending through the shim. The end portion of the coolant conduit system includes a through hole extending from a first surface of the shim facing a bottom of the recess to an opposite second surface of the shim. The end portion has a coolant outlet opening at the second surface, the coolant outlet opening being formed by the shim alone. The shim and the coolant outlet opening are configured to direct a jet of coolant from the coolant outlet opening unobstructed by the cutting tool insert towards a space expected to comprise a cutting zone of a workpiece.

Since the coolant outlet opening is formed by the shim alone, and the shim and the coolant outlet opening are configured to direct a jet of coolant from the coolant outlet opening unobstructed by the cutting tool insert towards a space expected to comprise a cutting zone of a workpiece, the jet of coolant is able to be directed towards the workpiece from a relief face side of a cutting edge of the cutting insert, the jet of coolant being guided only by the shim towards the space expected to comprise a cutting zone of a workpiece. The cutting insert, and any wear on the cutting insert, will not affect the jet of coolant. As a result, the above mentioned object is achieved.

Moreover, when providing coolant to a cutting area from the relief face side of a cutting tool insert, the coolant is directed towards the cutting insert from an area of the holder that is prone to damage in case of e.g. using too high a feeding of the turning tool holder, which causes the cutting tool insert to rupture and thus, exposes the area tangentially below the cutting tool insert to damage. This may cause an end portion of a coolant passage beneath the cutting tool insert to be destroyed or altered. Therefore, providing the end portion of the coolant passage in the shim and the coolant outlet opening formed by the shim alone makes the end portion exchangeable together with the shim. Thus, a damaged end portion of the coolant passage may easily be remedied by exchanging a damaged shim.

The turning tool holder may include a simple shank for securing the turning tool holder to a relevant lathe. Alternatively, the turning tool holder may comprise a more elaborate connection system for securing the turning tool holder to a relevant lathe. One example of such a system is the Coromant Capto® tool holder system.

The term "through hole" refers to a channel which is enclosed by delimiting surfaces on all sides, except at an entrance and an outlet of the channel.

According to an embodiment, a lateral portion of the shim may extend beyond the body of the cutting tool insert. The coolant outlet opening may be provided at the second surface in the lateral portion. In this manner the shim and the coolant outlet opening may be configured to direct a jet of coolant from the coolant outlet opening unobstructed by the cutting tool insert towards a space expected to comprise a cutting zone of a workpiece. Suitably, the entire coolant outlet opening is arranged in the lateral portion.

According to an embodiment, the through hole may have a uniform diameter substantially along its entire extension through the shim. In this manner the through hole may be easily manufactured by electric discharge machining (EDM). Since the shim is commonly manufactured from ceramics, nitrides, and/or carbides, EDM may be the most convenient way of producing a precise through hole through the shim. However, the through hole may alternatively be drilled, e.g. before sintering of the shim, or is the shim is manufactured from a different material, such as steel which may be hardened after drilling. These embodiments encompass through holes with entrances and/or outlets of other shape than the uniform diameter of the remainder of the through hole, e.g. there may be provided a chamfer in the shim at the entrance and/or outlet of the through hole.

According to an embodiment, the through hole may include at least one conical portion. In this manner there may be provided a chamfer in the shim at the entrance and/or outlet of the through hole. Such a chamfer may provide a controlled shape of the entrance and/or the outlet of the through hole. At the outlet, the chamfer may shape a jet of coolant ejected from the coolant outlet opening. Alternatively, or additionally, the through hole may have two different diameters with a conical transition between the two diameters.

According to an embodiment, a section of the first portion of the coolant conduit system adjacent to the end portion may be formed by the shim and a depression in the tool body in the bottom portion of the recess. In this manner, it may be ensured that coolant may be directed from the tool body to the end portion of the coolant conduit system. Moreover, by forming the depression over an area larger than the diameter of the through hole of the end portion, shims with differently located through hole entrances at the first side of the shim may be used with the same tool body. Thus, the coolant directing characteristics of the end portion, such as coolant jet direction, coolant jet diameter, and coolant jet convergence may be arranged simply by exchanging the shim.

According to an embodiment, the first portion of the coolant conduit system may have a straight conduit portion and a coolant distribution passage in the tool body. The straight conduit portion may extend from the depression to the coolant distribution passage. In this manner a conduit connection between the depression and the coolant distribution passage may be easily manufactured by drilling in the tool body. The coolant distribution passage may be a portion of the coolant conduit system which is configured for distributing coolant to more than one coolant outlet opening.

According to an embodiment, the depression may include a surface extending substantially perpendicularly to the straight conduit portion. In this manner a surface may be provided for a drill bit to engage with at a right angle. Thus, it may be ensured that the straight conduit portion may be drilled in an intended direction in the tool body. Alternatively, the straight conduit portion may be formed by EDM in the tool body. Also for EDM the surface extending substantially perpendicularly to the straight conduit portion may be advantageous.

According to an embodiment, the straight conduit portion may extend at an acute angle to a plane extending along the bottom portion of the recess and the shim. In this manner the straight conduit portion may connect to the coolant distribution passage, which extends in a different portion of the tool body than the depression and the straight conduit portion. Moreover, the recess and the shim are commonly arranged at a portion of the tool body, which portion is comparatively narrower than the remainder of the tool body to ensure that the cutting tool inset can come close to a relevant workpiece. By the straight conduit portion extending at the acute angle, the straight conduit portion may be able to reach the coolant distribution passage, which extends in a different portion of the tool body. Thus, this may be achieved by the straight conduit portion only.

According to an embodiment, the end portion has a first diameter and the straight conduit portion may have a second diameter. The second diameter may be equal to or larger than the first diameter. In this manner it may be ensured that the straight conduit portion does not cause an unnecessarily large pressure drop in the coolant compared to the pressure drop caused in the end portion.

According to an embodiment, the coolant distribution passage may form an inlet portion of the coolant conduit system comprising a connection arrangement for connecting the coolant conduit system to a coolant supply system of a relevant lathe. In this manner coolant from the lathe may be distributed via the coolant distribution passage to the end portion of the coolant conduit system in the shim. The connection arrangement may for instance include a quick coupling or a threaded connection.

According to an embodiment, the coolant distribution passage may extend in a different direction than the straight conduit portion.

According to an embodiment, the shim may have an opening for securing the shim to the tool body. The opening may be separate from the through hole. In this manner the coolant flow in the through hole may not be disturbed by any securing arrangement associated with the opening. Furthermore, in this manner the opening may be located in a position of the shim most suitable for securing the shim to the tool body, e.g. at a central portion of the shim whereas, the though hole may be positioned to direct a jet of coolant from the coolant outlet opening unobstructed by the cutting tool insert towards a space expected to comprise a cutting zone of a workpiece. Suitably, the opening is a through opening extending through the shim.

According to an embodiment, the cutting tool insert may be an eight times indexable cutting tool insert.

According to an embodiment, the cutting tool insert may include an insert body. The insert body may have two opposite parallel side surfaces and four mutually substantially identical lateral surfaces extending between the side surfaces. The cutting tool insert may have four separate cutting edges arranged symmetrically at each side surface, wherein each separate cutting edge may have a first cutting edge portion extending along a rim portion of a side surface and a second cutting edge portion extending along a rim portion of a lateral surface in a direction from the side surface towards an imaginary middle plane arranged between and in parallel with the side surfaces. The first cutting edge portion may be interconnected with the second cutting edge portion via a corner edge portion. Seen in a side view along a center axis, the center axis extending perpendicularly to the side surfaces. The cutting tool insert may include a corner point at each of the corner edge portions, four of the corner points being symmetrically arranged at each of the side surfaces with equal diagonal distances between the corner points. A first angle between a first imaginary line extending from a first corner point to a second corner point of two adjacent corner points at one side surface and a second imaginary line extending along a tip portion of the first cutting edge portion at the first corner point may be within a range of 15-25 degrees. In this manner, the cutting tool insert may be configured to abut against the shim without the interfering with the coolant outlet opening in the shim. That is, within the range, at a relief face side of the cutting tool insert, the cutting tool insert is undercut enough to not interfere with the coolant outlet opening in the shim while maintaining a sufficiently strong support of the engaging cutting edge.

According to an embodiment, seen in the side view along the center axis, a second angle of approximately 17 degrees may be formed between a third imaginary line extending from the center axis to one of the corner points at a first side surface of the side surfaces and a fourth imaginary line extending from the center axis to an adjacent corner point of the corner points at a second side surface of the side surfaces. In this manner a clearance may be provided aft of a second cutting edge portion of an engaging cutting edge, i.e. the clearance may be provided along a line extending along the second cutting edge portion. Moreover, seen from a cutting edge at one of the side surfaces engaging with a workpiece, two adjacent cutting edges and their corresponding corner portions of the cutting tool insert at the opposite side surface may be arranged substantially within the same distance from the workpiece such that none of them interfere with the workpiece.

According to a further aspect of the present invention there is provided a cutting tool insert arranged to be used in a turning tool holder according to any aspect or embodiment herein, wherein the cutting tool insert is an eight times indexable cutting tool insert having an insert body, the insert body including two opposite parallel side surfaces and four mutually substantially identical lateral surfaces extending between the side surfaces. The cutting tool insert further includes four separate cutting edges arranged symmetrically at each side surface, wherein each separate cutting edge have a first cutting edge portion extending along a rim portion of a side surface and a second cutting edge portion extending along a rim portion of a lateral surface in a direction from the side surface towards an imaginary middle plane arranged between and in parallel with the side surfaces, the first cutting edge portion being interconnected with the second cutting edge portion via a corner edge portion. Seen in a side view along a center axis, the center axis extending perpendicularly to the side surfaces, the cutting tool insert includes a corner point at each of the corner edge portions, four of the corner points being symmetrically arranged at each of the side surfaces with equal diagonal distances between the corner points, and wherein a first angle between a first imaginary line extending from a first corner point to a second corner point of two adjacent corner points at one side surface and a second imaginary line extending along a tip portion of the first cutting edge portion at the first corner point is within a range of 15-25 degrees.

Thus, the cutting tool insert is configured to abut against a shim of a turning tool holder without interfering with an outlet opening for coolant in the shim. Accordingly, a coolant outlet opening formed by the shim alone may direct a jet of coolant from the coolant outlet opening unobstructed by the cutting tool insert towards a space expected to comprise a cutting zone of a workpiece.

According to an embodiment, seen in the side view along the center axis a second angle of approximately 17 degrees may be formed between a third imaginary line extending from the center axis to one of the corner points at a first side surface of the side surfaces and a fourth imaginary line extending from the center axis to an adjacent corner point of the corner points at a second side surface of the side surfaces.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Aspects of the present invention will now be described more fully. Like numbers refer to like elements throughout. Well-known functions or constructions will not necessarily be described in detail for brevity and/or clarity.

Figure 1:
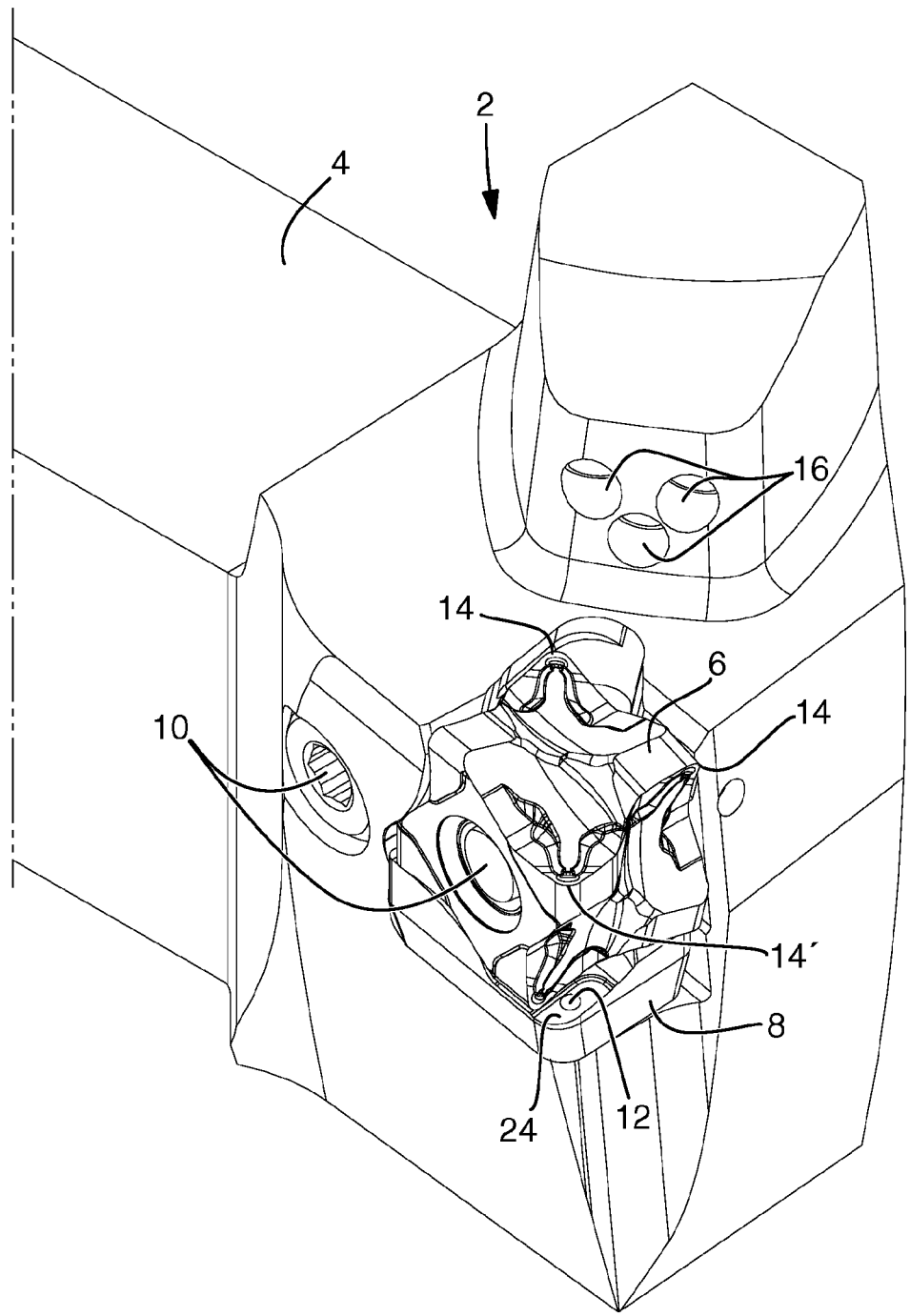
FIG. 1 illustrates a turning tool holder according to an embodiment.

FIG. 1 illustrates a turning tool holder 2 according to an embodiment. The turning tool holder 2 includes a tool body 4, a cutting tool insert 6, a shim 8, and a clamping arrangement 10. The cutting tool insert 6 is an eight times indexable cutting tool insert, i.e. it has eight separate cutting edges 14, 14', which one at a time may be positioned to extend out of the turning tool holder 2 to engage with a relevant workpiece. A coolant conduit system extends through the turning tool holder 2. A coolant outlet opening 12 of the coolant conduit system is provided in the shim 8. From the coolant outlet opening 12 a jet of coolant may be directed from a relief face side of an engaging cutting edge 14' of the cutting tool insert 6 towards a space expected to comprise a cutting zone of a workpiece. Optionally, the turning tool holder may have one or more additional coolant outlet openings 16 as illustrated in FIG. 1.

Figure 2:
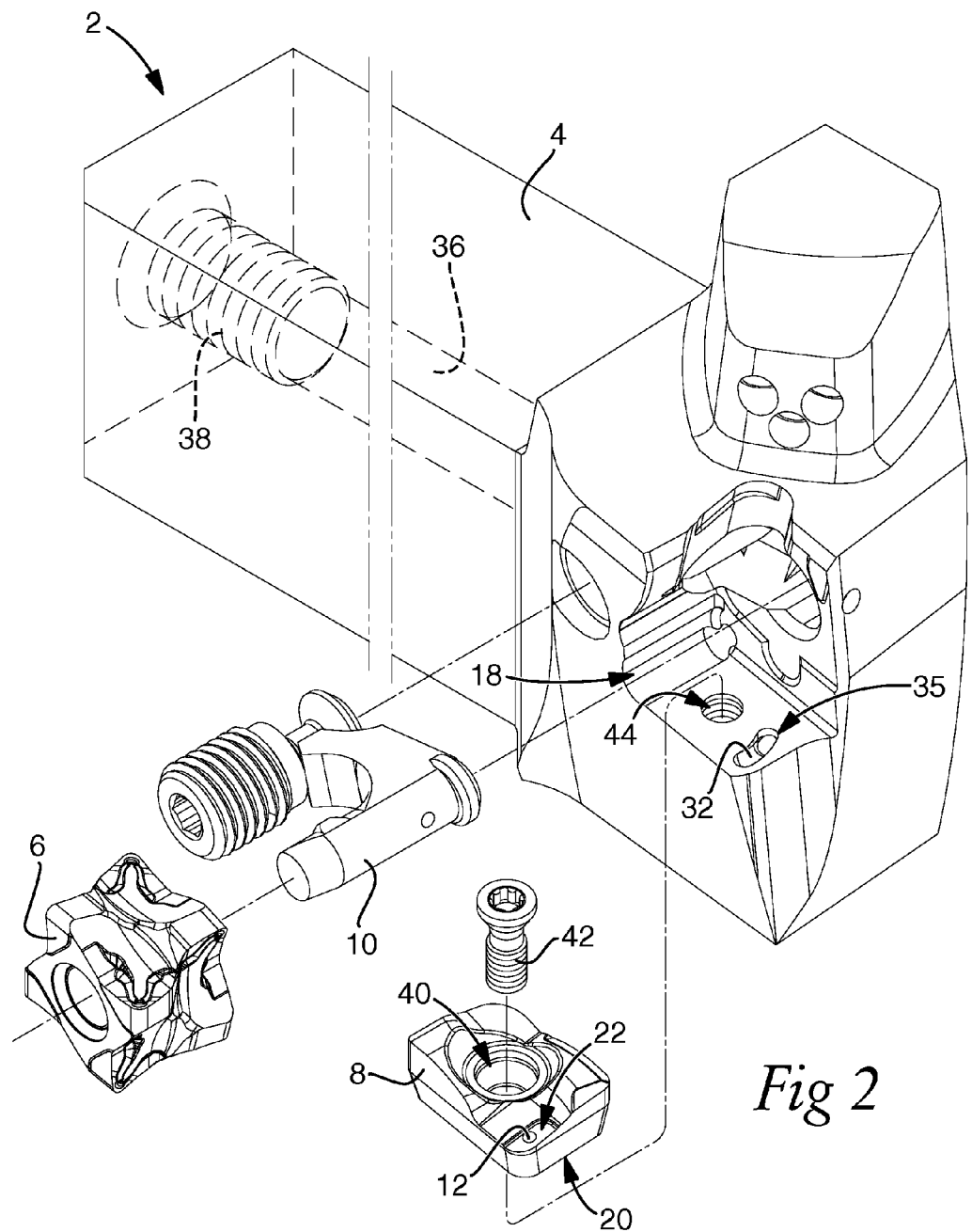
FIG. 2 illustrates the turning tool holder of FIG. 1 in an exploded view.

FIG. 2 illustrates the turning tool holder 2 of FIG. 1 in an exploded view. The tool body 4 has a recess 18. The shim 8 is arranged at a bottom portion of the recess 18. The cutting tool insert 6 is releasably clamped by the clamping arrangement 10 against the shim 8, as shown in FIG. 1. A first portion of the coolant conduit system extends through the tool body 4 and an end portion of the coolant conduit system extends through the shim 8. The end portion of the coolant conduit system includes a through hole extending from a first surface 20 of the shim 8 to an opposite second surface 22 of the shim 8. The first surface 20 of the shim 8 is arranged to face a bottom of the recess 18 and the opposite second surface 22 of the shim is arranged to face or at least partially face the cutting tool insert 6.

The end portion includes the coolant outlet opening 12 at the second surface 22. The coolant outlet opening 12 is formed by the shim 8 alone. The shim 8 and the coolant outlet opening 12 are configured to direct a jet of coolant from the coolant outlet opening 12 unobstructed by the cutting tool insert 6 towards a space expected to have a cutting zone of a workpiece. This may entail the position of the coolant outlet opening 12 in the shim 8, the direction of the through hole, and the shape of the shim 8.

Referring again to FIG. 1, a lateral portion 24 of the shim 8 extends beyond the body of the cutting tool insert 6. The coolant outlet opening 12 is provided at the second surface 22 in this lateral portion 24.

Figure 3A:
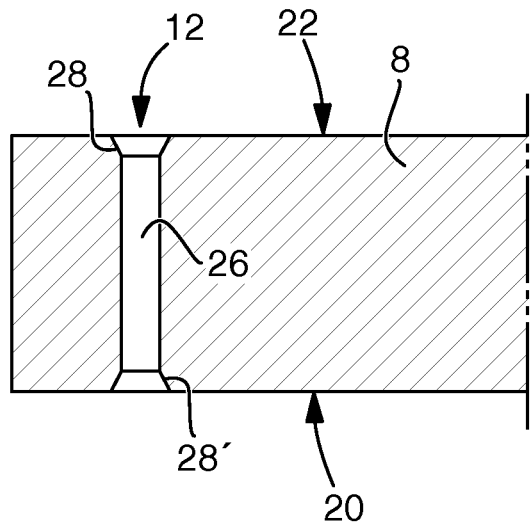
FIGS. 3a and 3b illustrate cross-sections through shims according to an embodiment.
Figure 3B:
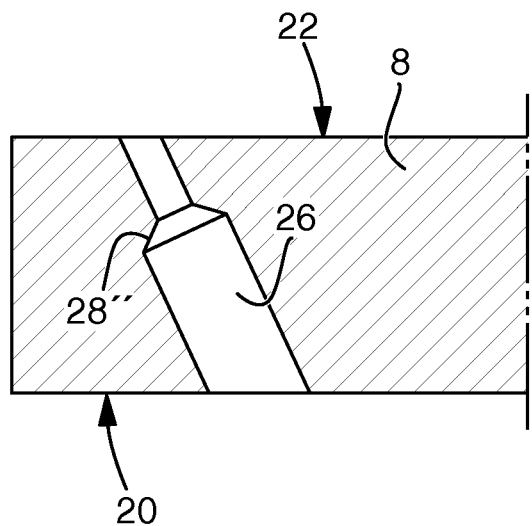

FIGS. 3a and 3b illustrate cross-sections through shims 8 according to embodiments to be used in a turning tool holder according to the present disclosure. An end portion of a coolant conduit system includes a through-hole 26 extending from the first surface 20 of the shim 8 to the opposite second surface 22 of the shim 8.

In the embodiment illustrated in FIG. 3a, the through hole 26 has a uniform diameter substantially along its entire length through the shim 8. The through hole 26 has two conical portions 28, 28' providing a chamfer in the shim 8, at the entrance and at the coolant outlet opening 12 of the through-hole 26.

In the embodiment illustrated in FIG. 3b, the through-hole 26 has one conical portion 28" providing a conical transition between two different diameter portions of the through hole 26.

Figure 4:
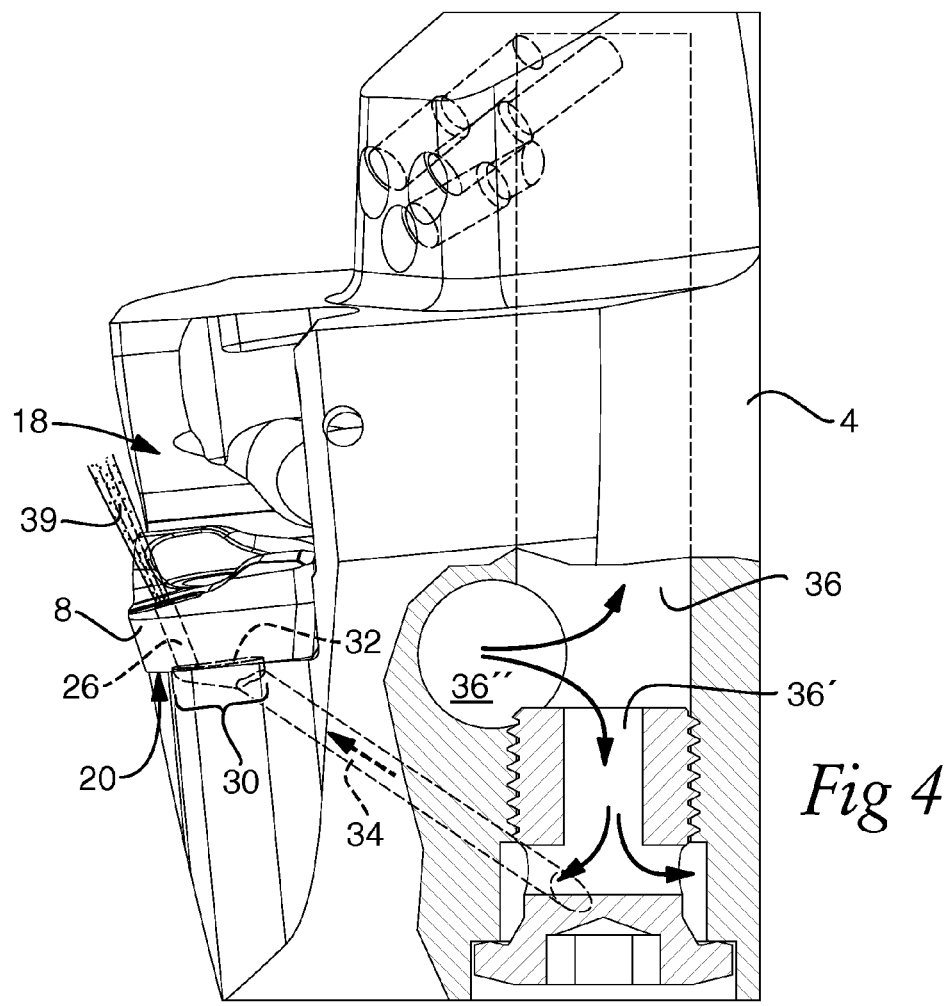
FIG. 4 illustrates a view of the turning tool holder of FIGS. 1 and 2.

FIG. 4 illustrates a partial cross-sectional view of the turning tool holder 2 of FIGS. 1 and 2. As shown, the first portion of the coolant conduit system extends through the tool body 4 and the end portion of the coolant conduit system extends through the shim 8. The end portion includes through-hole 26, as discussed above with reference to the embodiments of FIGS. 3a and 3b. A section 30 of the first portion of the coolant conduit system adjacent to the end portion is formed by the shim 8 and a depression 32 in the tool body 4 in the bottom portion of the recess 18. The first portion of the coolant conduit system further includes a straight conduit portion 34 in the tool body 4 and a coolant distribution passage 36 in the tool body 4. The straight conduit portion 34 extends from the depression 32 to the coolant distribution passage 36. The coolant distribution passage 36 forms an inlet portion of the coolant conduit system and include a connection arrangement for connecting the coolant conduit system to a coolant supply system of a relevant lathe. In these embodiments the coolant distribution passage 36 includes several coolant distribution passages 36', 36". With reference to FIG. 2 a connection arrangement 38 for connecting the coolant conduit system to a coolant supply system of a relevant lathe having a threaded connection is schematically illustrated.

Referring to FIG. 4, coolant in the coolant conduit system flows from the coolant distribution passage 36 through the straight conduit portion 34, the section 30, and the through-hole 26 to the coolant outlet opening 12. From the coolant outlet opening 12 a jet 39 of coolant is directed towards a space expected to have a cutting zone of a workpiece.

The depression 32 includes a surface 35 extending substantially perpendicularly to the straight conduit portion 34, see FIG. 2, i.e. the surface 35 of the tool body 4 in the depression 32 through which the straight conduit portion 34 is drilled during manufacturing of the turning tool holder. As shown in FIG. 4, the straight conduit portion 34 extends at an acute angle to a plane extending along the bottom portion of the recess 18 and first surface 20 of the shim 8. Thus, the straight conduit portion 34 is connected to the coolant distribution passage 36.

Also, the coolant distribution passage 36 is suitably produced by drilling in the tool body 4. Since the coolant distribution passage 36 has to be connected to the coolant distribution system of a relevant lathe, the coolant distribution passage 36 has to have one end accordingly arranged in the tool body 4. Due to the acute angle, the straight conduit portion 34 is able to reach the thus arranged coolant distribution passage 36. The coolant distribution passage 36 extends in a different direction than the straight conduit portion 34.

As shown in FIG. 4, the through-hole 26 of the end portion has a first diameter and the straight conduit portion 34 has a second diameter. The second diameter in these embodiments is larger than the first diameter.

Referring again to FIG. 2, the shim 8 has an opening 40 for securing the shim 8 to the tool body 4. The opening 40 is separate from the through-hole and the coolant outlet opening 12. A bolt 42 is arranged to extend through the opening 40 and to engage with a threaded hole 44 in the tool body 4 to secure the shim 8 to the tool body 4.

Figure 5:
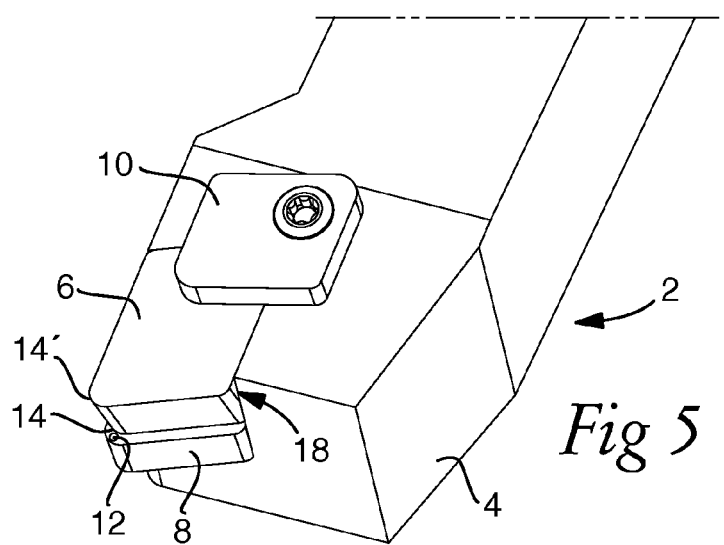
FIG. 5 illustrates a turning tool holder according to an embodiment.

FIG. 5 illustrates a turning tool holder 2 according to another embodiment. The turning tool holder 2 has tool body 4, cutting tool insert 6, shim 8, and clamping arrangement 10. The shim 8 and the cutting tool insert 6 are arranged in a recess 18 of the tool body 4. The cutting tool insert 6 is a four times indexable cutting tool insert, i.e. it includes four separate cutting edges 14, 14', which one at a time may be positioned to extend out of the recess 18 in the turning tool holder 2 to engage with a relevant workpiece. Two of the cutting edges 14, 14' are visible in FIG. 5. The other two cutting edges are positioned in the recess 18. In these embodiments the cutting tool insert 6 has a rhombus shape. A coolant conduit system extends through the turning tool holder 2. A coolant outlet opening 12 of the coolant conduit system is provided in the shim 8. From the coolant outlet opening 12 a jet of coolant may be directed from a relief face side of an engaging cutting edge 14' of the cutting tool insert 6 unobstructed by the cutting tool insert towards a space expected to comprise a cutting zone of a workpiece. Further aspects and features of the cutting tool holder 2 may be similar to the embodiments discussed in connection with FIGS. 1-4.

Figure 6A:
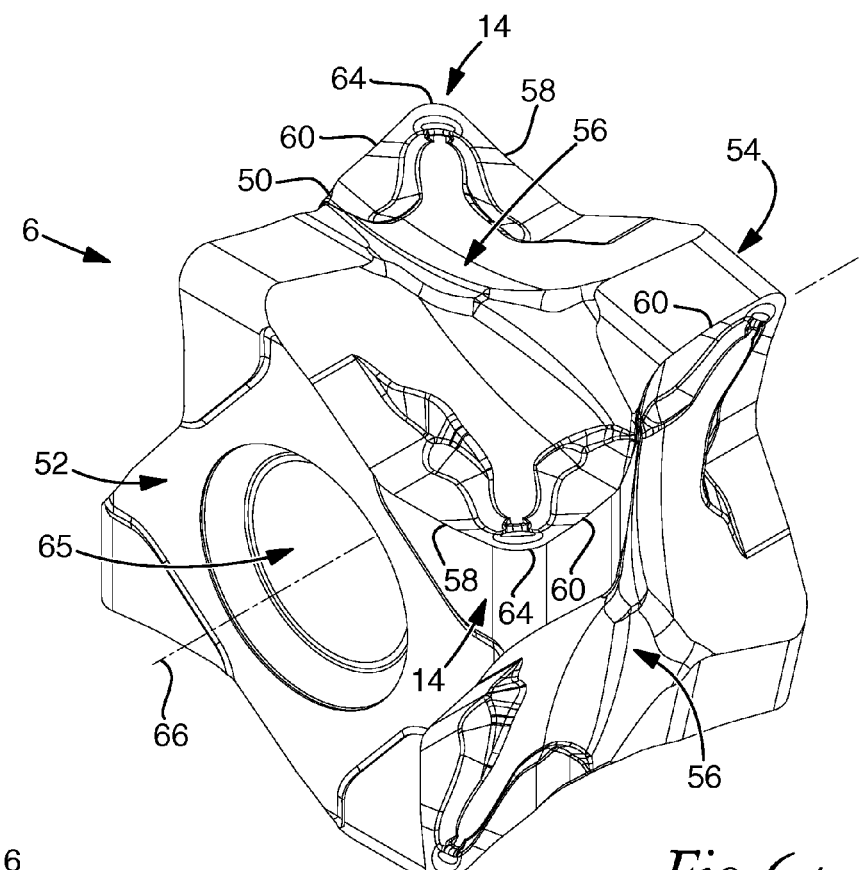
FIGS. 6a-6c illustrate a cutting tool insert according to an embodiment.
Figure 6B:
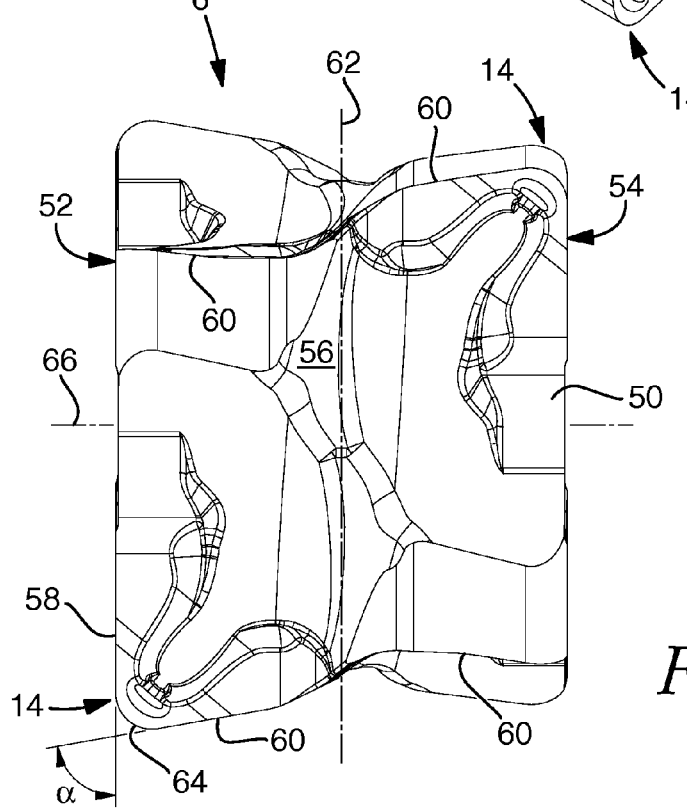
Figure 6C:
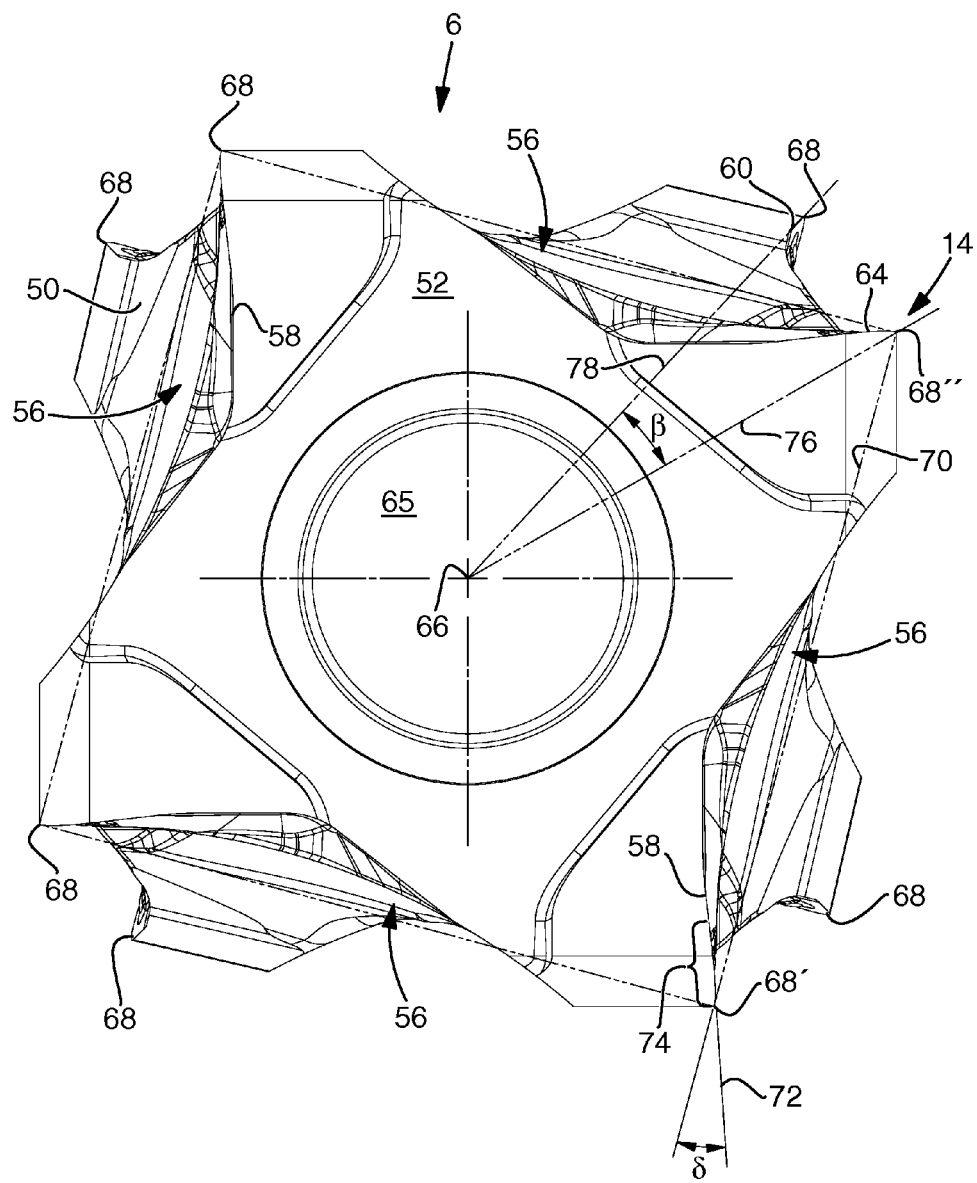

FIGS. 6a-6c illustrate a cutting tool insert 6 according to another embodiment. The cutting tool insert 6 is arranged to be used in a turning tool holder according to any aspect or embodiment discussed herein. FIG. 6a illustrates the cutting tool insert 6 in a perspective view, FIG. 6b illustrates the cutting tool insert 6 in a side view perpendicularly to a center axis 66 of the cutting tool insert 6, and FIG. 6c illustrates the cutting tool insert 6 in a side view along the center axis 66.

The cutting tool insert 6 includes an insert body 50. The insert body 50 has two opposite parallel side surfaces 52, 54 and four mutually substantially identical lateral surfaces 56 extending between the side surfaces 52, 54. Whereas the side surfaces 52, 54 are substantially flat over large portions thereof, each lateral surface 56, seen as a whole, is an uneven surface. The cutting tool insert 6 has four separate cutting edges 14 arranged symmetrically at each side surface 52, 54. Each separate cutting edge 14 includes a first cutting edge portion 58 extending along a rim portion of a side surface 52, 54 and a second cutting edge portion 60 extending along a rim portion of a lateral surface 56 in a direction from the side surface 52, 54 towards an imaginary middle plane 62 arranged between and in parallel with the side surfaces 52, 54, see FIG. 6b. Put differently, the first cutting edge portion 58 extends along an intersection between a rake face of the cutting edge 14 and a relief face of the first cutting edge portion 58 provided by one of the side surfaces 52, 54. The second cutting edge portion 60 extends along an intersection between the rake face of the cutting edge 14 and a relief face of the second cutting edge portion 60 provided by one of the lateral surfaces 56. Alternatively, it may be said that the first cutting edge portion 58 extends along an intersection between one of the side surfaces 52, 54 and one of the lateral surfaces 56, and the second cutting edge portion 60 extends along an intersection between two of the lateral surfaces 56.

The imaginary middle plane 62 extends at the middle of the cutting tool insert 6 between the side surfaces 52, 54. The first cutting edge portion 58 is interconnected with the second cutting edge portion 60 via a corner edge portion 64. The insert body 50 includes a through hole 65 extending along the center axis 66. The cutting tool insert 6 may be clamped to a relevant turning tool holder in the through-hole 65.

The corner edge portion 64 may form a circular arc extending between the first cutting edge portion 58 and the second cutting edge portion 60. Alternatively, the corner edge portion 64 may form a curve having more than one radius. Only some of the eight cutting edges 14, their first and second cutting edge portions 58, 60 and corner edge portions 64, are indicated with reference numerals in FIGS. 6a-6c. The eight cutting edges 14 are located symmetrically at corner portions of the insert body 6, and since the eight cutting edges 14 and the respective corner portions are identical, their different details are also clearly shown at cutting edges and corner portions shown in FIGS. 6a-6c which are not provided with reference numerals. The same is valid also for other details of the cutting tool insert 6.

The center axis 66 extends perpendicularly to the side surfaces 52, 56 through the cutting tool insert 6. As seen in a side view along the center axis 66, i.e. in a view as illustrated in FIG. 6c, the cutting tool insert 6 includes a corner point 68 at each of the corner edge portions 64. Four of the corner points 68 are symmetrically arranged at each of the side surfaces 52, 54 with equal diagonal distances between the corner points 68 of each side surface 52, 54. Put differently, the four corner points 68 at each side surface 52, 54 are arranged in a square, as indicated by broken lines in FIG. 6c. Each corner point 68 forms an outermost point of each cutting edge 14, as seen in the side view along the center axis 66. In a perspective view, the corner points 68 may not be clearly distinguishable due to the arc-shaped corner edge portions 64 and a smooth transition between the corner edge portions 64 and their respective first and second cutting edge portions 58, 60.

A first angle δ between a first imaginary line 70 extending from a first corner point 68' to a second corner point 68" of two adjacent corner points 68 at one side surface 52 and a second imaginary line 72 extending along a tip portion 74 of the first cutting edge portion 58 at the first corner point 68' is within a range of 15-25 degrees. In this manner, at a relief face side of the cutting edge 14 at the second corner point 68", the cutting tool insert 6 is undercut to not interfere with the coolant outlet opening in the shim when the cutting tool insert 6 is arranged in a turning tool holder.

Seen in the side view along the center axis 66, i.e. in the view illustrated in FIG. 6c, a second angle β of approximately 17 degrees may be formed between a third imaginary line 76 extending from the center axis 66 to one of the corner points 68" at a first side surface 52 of the side surfaces 52, 54 and a fourth imaginary line 78 extending from the center axis 66 to an adjacent corner point 68 of the corner points 68 at a second side surface 54 of the side surfaces 52, 54.

A corner angle α between the first cutting edge portion 58 and the second cutting edge portion 60 may be within a range of 75 to <90 degrees. In these embodiments, the first and second cutting edge portions 58, 60 are straight, as seen in a view from above relevant cutting edge 14. If the first and/or second cutting edge portions are curved, the corner angle a is measured between tangents of the first and/or second cutting edge portions. The first cutting edge portion 58 and the second cutting edge portion 60 have substantially the same length. Thus, a substantially equal cutting depth along each of two orthogonal cutting directions may be provided by each cutting edge 14.

Depending on the embodiment, lengths of the cutting edge portions 58, 60 may be defined in a suitable manner. For instance, a length of the first and second cutting edge portions 58, 60 may be defined inter alia by ground portions of the side surfaces 52, 54 and ground portions of the lateral surfaces 56. Another example of defining a length of the first and second cutting edge portions 58, 60 may be from an intersection between lines extending along the first and second cutting edge portions 58, 60 to a distinct direction change of a rim portion of the insert body 50. Alternatively, the length may be defined from an end of the arc forming the corner edge portion 64. A further definition of the length of the first and second cutting edge portions 58, 60 may be the portion of a cutting edge portion 58, 60, along which a relevant chip breaker extends.

According to embodiments, the first cutting edge portion 58 and the second cutting edge portion 60 each may be arranged to provide a cutting depth of at least 4 mm along each of two orthogonal cutting directions. Mentioned purely as an example, the distance between the side surfaces 52, 54 along the centre axis 66 may be 10 mm and the distance between two adjacent corner points 68 may be 11 mm.

The cutting tool insert 6 may have a ratio of approximately 1:1 between a distance extending between the side surfaces 52, 54 along the center axis 66 and a distance extending between two adjacent corner points 68 at one of the side surfaces 52, 54. The cutting tool insert 6 thus may be shaped to provide second cutting edge portions 60 of substantially the same length as the first cutting edge portions 58 and the cutting tool insert 6 may be used in both right hand and left hand tool holders. Moreover, this is not only the case with the illustrate ratio, but also with a cutting tool insert 6 having a ratio within a range of 0.7:1 to 1.1:1 between the said distances.

This disclosure should not be construed as limited to the embodiments set forth herein. A person skilled in the art will realize that different features of the embodiments disclosed herein may be combined to create embodiments other than those described herein, without departing from the scope of the present invention, as defined by the appended claims. It is also understood by those skilled in the art that the cutting insert may be implemented in right hand turning tool holders as well as the illustrated left hand turning tool holders.

Although the disclosure has been described with reference to example embodiments, many different alterations, modifications and the like will become apparent for those skilled in the art. For instance, the shim 8 may be provided with one or more further through holes forming part of the coolant conduit system and arranged for directing one or more further jets of coolant towards a workpiece. Therefore, it is to be understood that the foregoing is illustrative of various example embodiments and that the disclosure is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:
1. A turning tool holder comprising:
a tool body including a recess;
a cutting tool insert;
a shim arranged at a bottom portion of the recess;

a clamping arrangement, the cutting tool insert being releasably clamped by the clamping arrangement against the shim; and a coolant conduit system, a first portion of the coolant conduit system extending through the tool body and an end portion of the coolant conduit system extending through the shim, a section of the first portion of the coolant conduit system adjacent to the end portion is formed by the shim and a depression in the tool body in the bottom portion of the recess, the end portion of the coolant conduit system including a through hole having a length extending from a first surface of the shim facing a bottom of the recess to an opposite second surface of the shim, and a coolant outlet opening at the second surface, the coolant outlet opening being formed by the shim alone, and wherein the shim and the coolant outlet opening are configured to direct a jet of coolant from the coolant outlet opening unobstructed by the cutting tool insert towards a space expected to comprise a cutting zone of a workpiece.

2. The turning tool holder according to claim 1, wherein a lateral portion of the shim extends beyond a body of the cutting tool insert, and wherein the coolant outlet opening is provided at the second surface in the lateral portion.

3. The turning tool holder according to claim 1, wherein the through hole has a uniform diameter substantially along its entire length through the shim.

4. The turning tool holder according to claim 1, wherein the through hole includes at least one conical portion.

5. The turning tool holder according to claim 1, wherein the first portion of the coolant conduit system includes a straight conduit portion and a coolant distribution passage in the tool body, and wherein the straight conduit portion extends from the depression to the coolant distribution passage.

6. The turning tool holder according to claim 5, wherein the depression includes a surface extending substantially perpendicularly to the straight conduit portion.

7. The turning tool holder according to claim 5, wherein the straight conduit portion extends at an acute angle to a plane extending along the bottom portion of the recess and the shim.

8. The turning tool holder according to claim 5, wherein the end portion has a first diameter and the straight conduit portion has a second diameter, and wherein the second diameter is equal to or larger than the first diameter.

9. The turning tool holder according to claim 5, wherein the coolant distribution passage forms an inlet portion of the coolant conduit system including a connection arrangement for connecting the coolant conduit system to a coolant supply system of a relevant lathe.

10. The turning tool holder according to claim 5, wherein the coolant distribution passage extends in a different direction than the straight conduit portion.

11. The turning tool holder claim 1, wherein the shim includes an opening for securing the shim to the tool body, and wherein the opening is separate from the through hole.

12. The turning tool holder claim 1, wherein the cutting tool insert is an eight times indexable cutting tool insert.

13. The turning tool holder according to claim 12, wherein the cutting tool insert includes an insert body, the insert body having two opposite parallel side surfaces and four mutually substantially identical lateral surfaces extending between the side surfaces; four separate cutting edges arranged symmetrically at each side surface, each separate cutting edge including a first cutting edge portion extending along a rim portion of a side surface and a first cutting edge portion extending along a rim portion of a lateral surface in a direction from the side surface towards an imaginary middle plane arranged between and in parallel with the side surfaces, the first cutting edge portion being interconnected with the first cutting edge portion via a corner edge portion; and, as seen in a side view along a center axis, the center axis extending perpendicularly to the side surfaces, a corner point at each of the corner edge portions, four of the corner points being symmetrically arranged at each of the side surfaces with equal diagonal distances between the corner points, a first angle between a first imaginary line extending from a first corner point to a second corner point of two adjacent corner points at one side surface and a second imaginary line extending along a tip portion of the first cutting edge portion at the first corner point is within a range of 15-25 degrees.

14. The turning tool holder according to claim 13, wherein as seen in the side view along the center axis, a second angle of approximately 17degrees is formed between a third imaginary line extending from the center axis to one of the corner points at a first side surface of the side surfaces and a fourth imaginary line extending from the center axis to an adjacent corner point of the corner points at a second side surface of the side surfaces.

15. A cutting tool insert arranged to be used in a turning tool holder including a tool body having a recess, a shim arranged at a bottom portion of the recess, a clamping arrangement, the cutting tool insert-being releasably clamped by the clamping arrangement against the shim, and a coolant conduit system, a first portion of the coolant conduit system extending through the tool body and an end portion of the coolant conduit system extending through the shim the end portion of the coolant conduit system including a through hole having a length extending from a first surface of the shim facing a bottom of the recess to an opposite second surface of the shim and a coolant outlet opening at the second surface, the coolant outlet opening being formed by the shim alone, and wherein the shim and the coolant outlet opening are configured to direct a jet of coolant from the coolant outlet opening unobstructed by the cutting tool insert towards a space expected to comprise a cutting zone of a workpiece, wherein the cutting tool insert is an eight times indexable cutting tool insert comprising:

an insert body, the insert body including two opposite parallel side surfaces and four mutually substantially identical lateral surfaces extending between the side surfaces;

four separate cutting edges arranged symmetrically at each side surface, wherein each separate cutting edge has a first cutting edge portion extending along a rim portion of a side surface and a first cutting edge portion extending along a rim portion of a lateral surface in a direction from the side surface towards an imaginary middle plane arranged between and in parallel with the side surfaces, the first cutting edge portion being interconnected with the first cutting edge portion via a corner edge portion, wherein as seen in a side view along a center axis, the center axis extending perpendicularly to the side surfaces; and a corner point at each of the corner edge portions, four of the corner points being symmetrically arranged at each of the side surfaces with equal diagonal distances between the corner points, and wherein a first angle between a first imaginary line extending from a first corner point to a second corner point of two adjacent corner points at one side surface and a second imaginary line extending along a tip portion of the first cutting edge portion at the first corner point is within a range of 15-25 degrees.

16. The cutting tool insert according to claim 15, wherein seen in the side view along the center axis a second angle of approximately 17 degrees is formed between a third imaginary line extending from the center axis to one of the corner points at a first side surface of the side surfaces -and a fourth imaginary line extending from the center axis to an adjacent corner point of the corner points at a second side surface of the side surfaces.

* * * * *